United States Patent
Schreter

(10) Patent No.: US 9,183,245 B2
(45) Date of Patent: Nov. 10, 2015

(54) IMPLICIT GROUP COMMIT WHEN WRITING DATABASE LOG ENTRIES

(75) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/290,763

(22) Filed: Nov. 7, 2011

(65) Prior Publication Data

US 2013/0117235 A1   May 9, 2013

(51) Int. Cl.
*G06F 17/00* (2006.01)
*G06F 17/30* (2006.01)
*G06F 11/14* (2006.01)

(52) U.S. Cl.
CPC ...... *G06F 17/30368* (2013.01); *G06F 11/1471* (2013.01)

(58) Field of Classification Search
USPC .................................. 707/999.102, 756, 704
See application file for complete search history.

(56) References Cited

U.S. PATENT DOCUMENTS

| | | | |
|---|---|---|---|
| 5,799,324 A * | 8/1998 | McNutt et al. | 1/1 |
| 6,003,036 A * | 12/1999 | Martin | 1/1 |
| 6,047,294 A * | 4/2000 | Deshayes et al. | 1/1 |
| 6,182,086 B1 * | 1/2001 | Lomet et al. | 1/1 |
| 6,493,837 B1 * | 12/2002 | Pang et al. | 714/45 |
| 6,732,124 B1 * | 5/2004 | Koseki et al. | 1/1 |
| 7,478,119 B2 * | 1/2009 | Paleczny et al. | 1/1 |
| 8,219,749 B2 * | 7/2012 | English | 711/114 |
| 2003/0014585 A1 * | 1/2003 | Ji | 711/112 |
| 2005/0010620 A1 * | 1/2005 | Silvers et al. | 707/205 |
| 2006/0036660 A1 * | 2/2006 | Lynn | 707/204 |
| 2006/0206539 A1 * | 9/2006 | Thompson | 707/202 |
| 2006/0218206 A1 * | 9/2006 | Bourbonnais et al. | 707/202 |
| 2007/0033191 A1 * | 2/2007 | Hornkvist et al. | 707/9 |
| 2007/0067366 A1 * | 3/2007 | Landis | 707/205 |
| 2008/0228835 A1 * | 9/2008 | Lashley et al. | 707/202 |
| 2009/0307438 A1 * | 12/2009 | Logan et al. | 711/153 |
| 2011/0004586 A1 * | 1/2011 | Cherryholmes et al. | 707/682 |
| 2012/0096055 A1 * | 4/2012 | Lee et al. | 707/822 |

* cited by examiner

*Primary Examiner* — Eliyah S Harper
(74) *Attorney, Agent, or Firm* — Mintz Levin Cohn Ferris Glovsky and Popeo, P.C.

(57) ABSTRACT

First k log buffers, in a data storage application including a plurality of log buffers are each loaded with exactly one transaction. Each log buffer is written to one of a plurality of log partitions. Thereafter, each of the log buffers is sent to an input/output (I/O) subsystem when they are respectively loaded with a single transaction. Transactions are subsequently accumulated in respective new current log buffers after sending the k log buffers to the I/O subsystem. The accumulated transactions are sent to the I/O subsystem when the earlier occurs of (i) the respective current log buffer being full or (ii) a number of incomplete input/output requests handled by the I/O subsystem falls below k. Related apparatus, systems, techniques and articles are also described.

20 Claims, 4 Drawing Sheets

IMPLICIT GROUP COMMIT WHEN WRITING DATABASE LOG ENTRIES

TECHNICAL FIELD

The subject matter described herein relates to techniques for grouping commits when writing database log entries.

BACKGROUND

Logging is used by databases to store operations performed on corresponding data in a synchronous fashion to a log while, at the same time, writing data to a corresponding data area asynchronously. In cases of a crash or other data recovery event, the data area is recovered to a potentially older state. Replaying the log will bring the database to the last committed state. Therefore, logging is an important performance-critical component of a database, both with respect to on-line operations as well as data recovery.

SUMMARY

First k log buffers, in a data storage application including a plurality of log buffers are each loaded with exactly one transaction. Each log buffer is written to one of a plurality of log partitions. Thereafter, each of the log buffers is sent to an input/output (I/O) subsystem when they are respectively loaded with a single transaction. Transactions are subsequently accumulated in respective new current log buffers after sending the k log buffers to the I/O subsystem. The accumulated transactions are sent to the I/O subsystem when the earlier occurs of (i) the respective current log buffer being full or (ii) a number of incomplete input/output requests handled by the I/O subsystem falls below k.

There can be k active I/O operations active on each log partition, wherein for n log partitions, log buffers belonging to the first k*n transactions are immediately closed and sent to the I/O subsystem. The respective log buffers can be closed prior to their being sent to the I/O subsystem. The log buffers can be distributed to log partitions according to a round-robin distribution.

A log can be generated by assembling a list of log entries based on the log buffers sent to the I/O subsystem. Data recovery can be initiated using the log upon an occurrence of a data recovery event. The transactions are committed and confirmation of a committed transaction can be sent to a corresponding application only after all data of the transaction and all previously-committed transactions has been persisted to the log. The data storage application can comprise an in-memory database. Each log partition can corresponds to segregated or separate physical disk storage space.

Articles of manufacture are also described that comprise computer executable instructions permanently stored on non-transitory computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages. For example, the group commit functionality described herein can greatly increase the number of transactions per second (TPS) that can be executed by a data storage application. In one database environment, TPS rates exceeding 1.6 million transactions per second were obtained.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
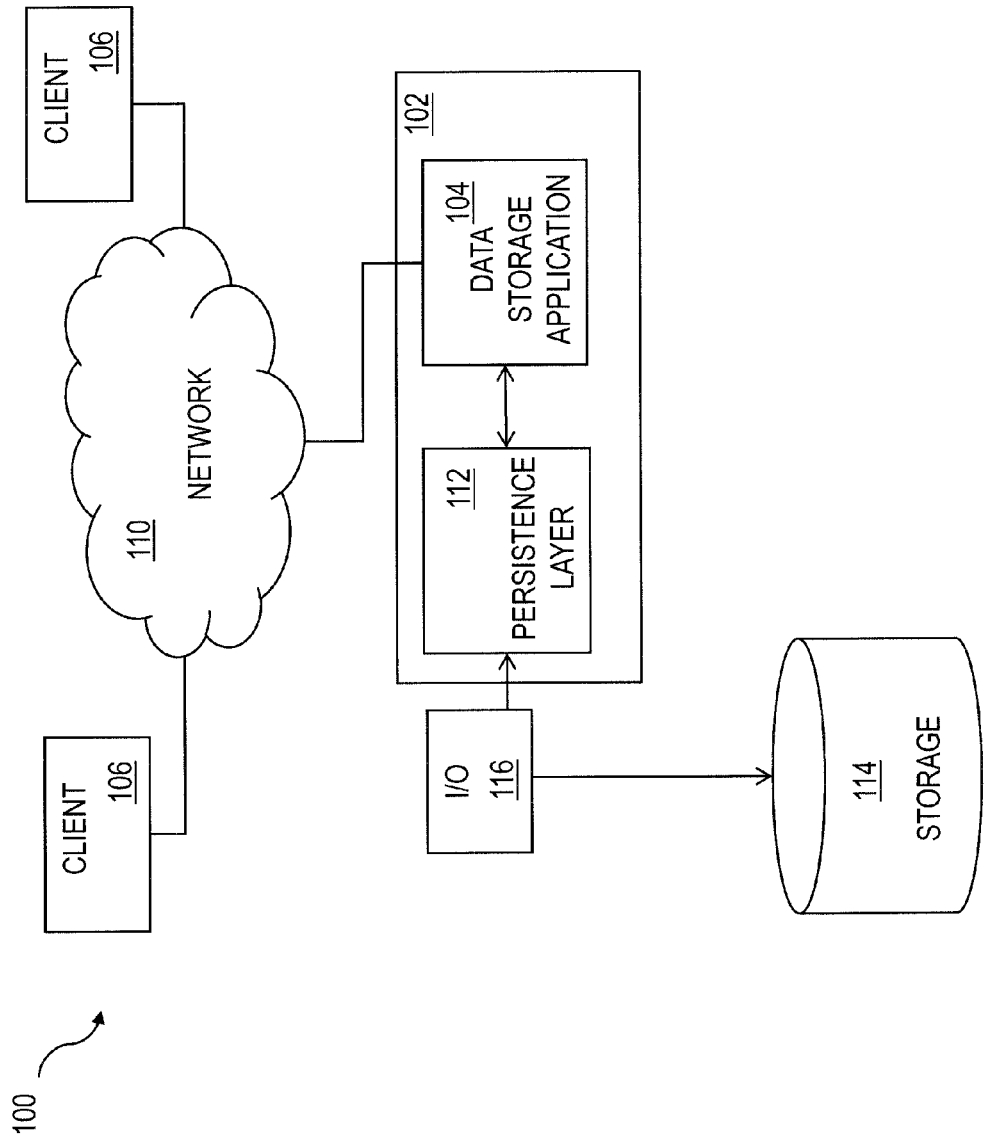
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output (I/O) subsystem 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output subsystem 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2:
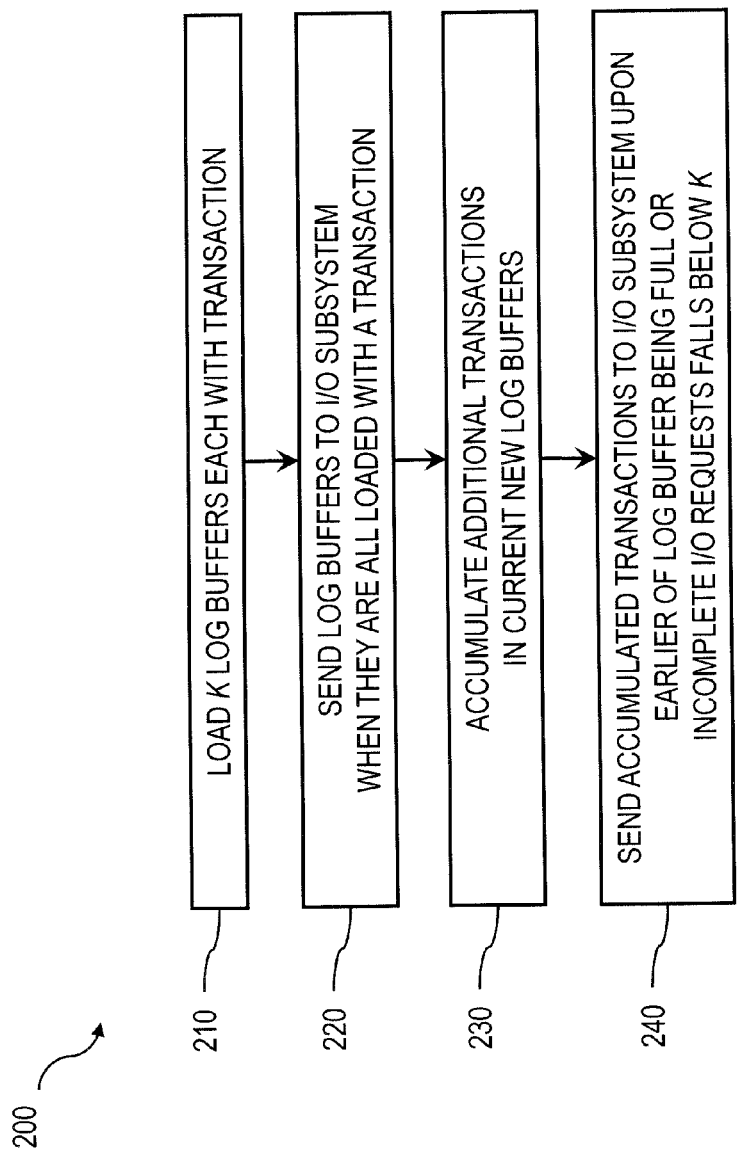
FIG. 2 is a process flow diagram illustrating a technique for grouping commits when writing database log entries.

FIG. 2 is a process flow diagram 200 in which, at 210, first k log buffers, in a data storage application including a plurality of log buffers, are loaded with exactly one transaction. Each log buffer is written to one of a plurality of log partitions. Each of the log buffers is sent, at 220, to an input/output (I/O) subsystem when they are respectively loaded with a single transaction. Transactions are accumulated, at 230, after in respective new current log buffers after sending the k log buffers to the I/O subsystem. The accumulated transactions are sent, at 240, to the I/O subsystem when the earlier occurs of (i) the respective current log buffer being full or (ii) a number of incomplete input/output requests handled by the I/O subsystem falls below k.

Figure 3:
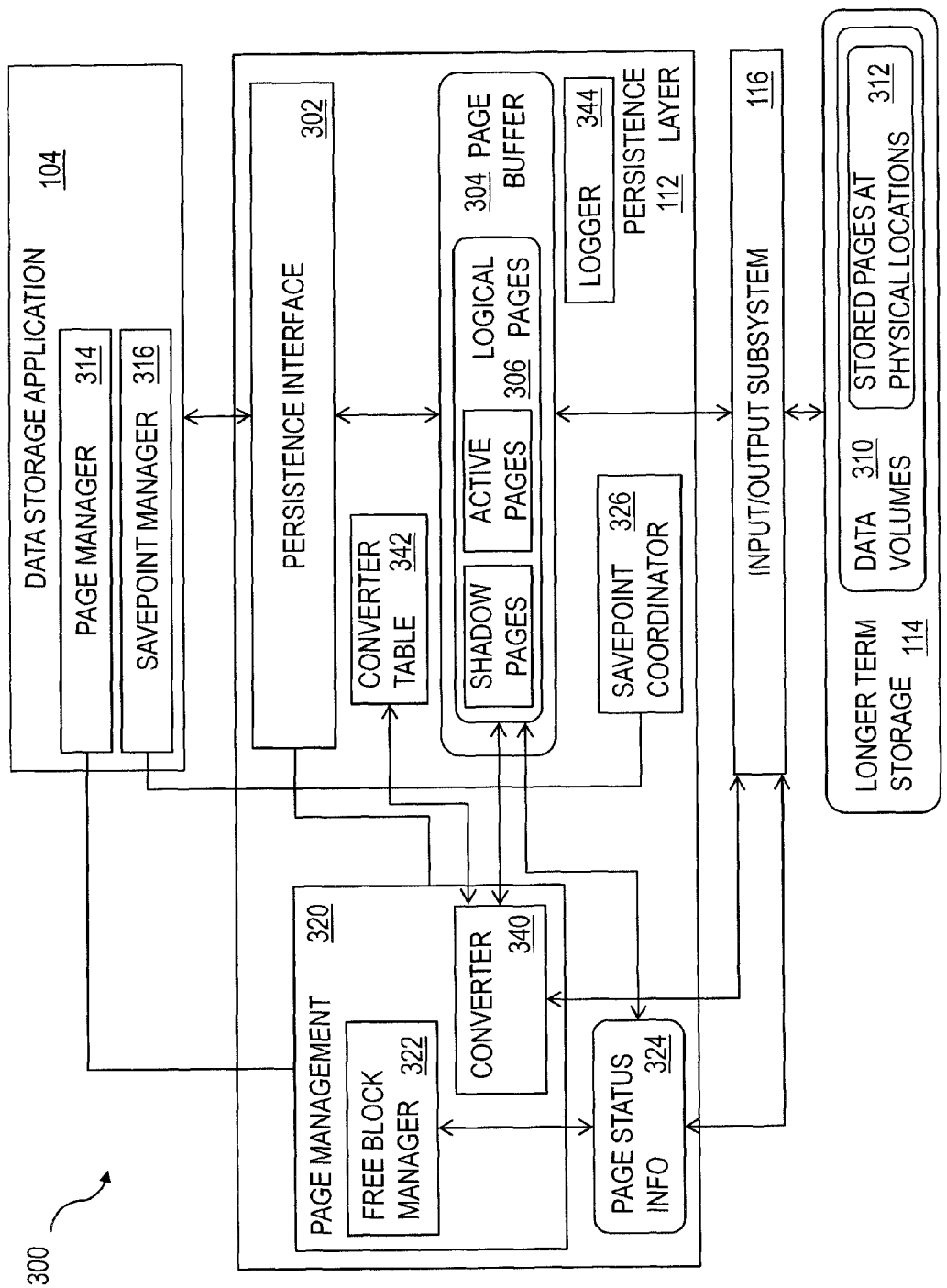
FIG. 3 is a diagram illustrating details of the system of FIG. 1.

FIG. 3 shows a software architecture 300 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 302. A page buffer 304 within the persistence layer 112 can store one or more logical pages 306, and optionally can include shadow pages, active pages, and the like. The logical pages 306 retained in the persistence layer 112 can be written to a storage (e.g. a longer term storage, etc.) 114 via an input/output subsystem 116, which can be a software module, a sub-system implemented in one or more of software and hardware, or the like. The storage 114 can include one or more data volumes 310 where stored pages 312 are allocated at physical memory blocks.

In some implementations, the data storage application 104 can include or be otherwise in communication with a page manager 314 and/or a savepoint manager 316. The page manager 314 can communicate with a page management module 320 at the persistence layer 112 that can include a free block manager 322 that monitors page status information 324, for example the status of physical pages within the storage 114 and logical pages in the persistence layer 112 (and optionally in the page buffer 304). The savepoint manager 316 can communicate with a savepoint coordinator 326 at the persistence layer 204 to handle savepoints, which are used to create a consistent persistent state of the database for restart after a possible crash.

In some implementations of a data storage application 104, the page management module of the persistence layer 112 can implement a shadow paging. The free block manager 322 within the page management module 320 can maintain the status of physical pages. The page buffer 304 can included a fixed page status buffer that operates as discussed herein. A converter component 340, which can be part of or in communication with the page management module 320, can be responsible for mapping between logical and physical pages written to the storage 114. The converter 340 can maintain the current mapping of logical pages to the corresponding physical pages in a converter table 342. The converter 340 can maintain a current mapping of logical pages 306 to the corresponding physical pages in one or more converter tables 342. When a logical page 306 is read from storage 114, the storage page to be loaded can be looked up from the one or more converter tables 342 using the converter 340. When a logical page is written to storage 114 the first time after a savepoint, a new free physical page is assigned to the logical page. The free block manager 322 marks the new physical page as "used" and the new mapping is stored in the one or more converter tables 342.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 344 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 344 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 112 can use a combination of undo log entries (from one or more logs) and shadow paging.

The persistence interface 302 can handle read and write requests of stores (e.g., in-memory stores, etc.). The persistence interface 302 can also provide write methods for writing data both with logging and without logging. If the logged write operations are used, the persistence interface 302 invokes the logger 344. In addition, the logger 344 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 344. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 344 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 344 can write a database log (or simply referred to herein as a "log") sequentially into a memory buffer in natural order (e.g., sequential order, etc.). If several physical hard disks/storage devices are used to store log data, several log partitions can be defined. Further details regarding a logger 344 utilizing log partitions can be found in co-pending U.S. patent application Ser. No. 13/290,286 filed on Nov. 7, 2011 (the contents of which are hereby fully incorporated by reference). With this implementation, the logger 344 ensures I/O completion callback ordering in a multiple-partition log. Therefore, even if a commit log record is written to a different partition, the confirmation of the commit is sent to the application only after all data of the transaction has been persisted by the logger 344 to the log in all log partitions affected.

Now, normally, after a commit log record is written, the in-memory buffer would be immediately closed and sent to I/O subsystem 116. Thus, many small transactions would generate a lot of I/O requests, which would overload the I/O subsystem 116 at no benefit. Each commit would incur synchronous I/O, which costs in general about 1 ms, thus limiting maximum TPS rate of the database. Moreover, each I/O requires padding to I/O block size (usually 4 KB), so the disk space is wasted. I/O subsystems usually work serially, i.e., they are not capable of concurrently processing more than 1-2 requests. Even high-performance filers effectively process the requests in-order, storing them into a staging area in memory and confirming immediately to the application, so there is no particular benefit sending a lot of I/O requests in parallel in comparison to sending requests serialized (with some small parallelity). So if we assume such a basically serial I/O subsystem 116, it makes sense to have only a few parallel I/Os active for each log partition (physical log disk or filer) at the same time. Let's denote this as k. Usually, k=2 is sufficient for today's I/O subsystems.

Figure 4:
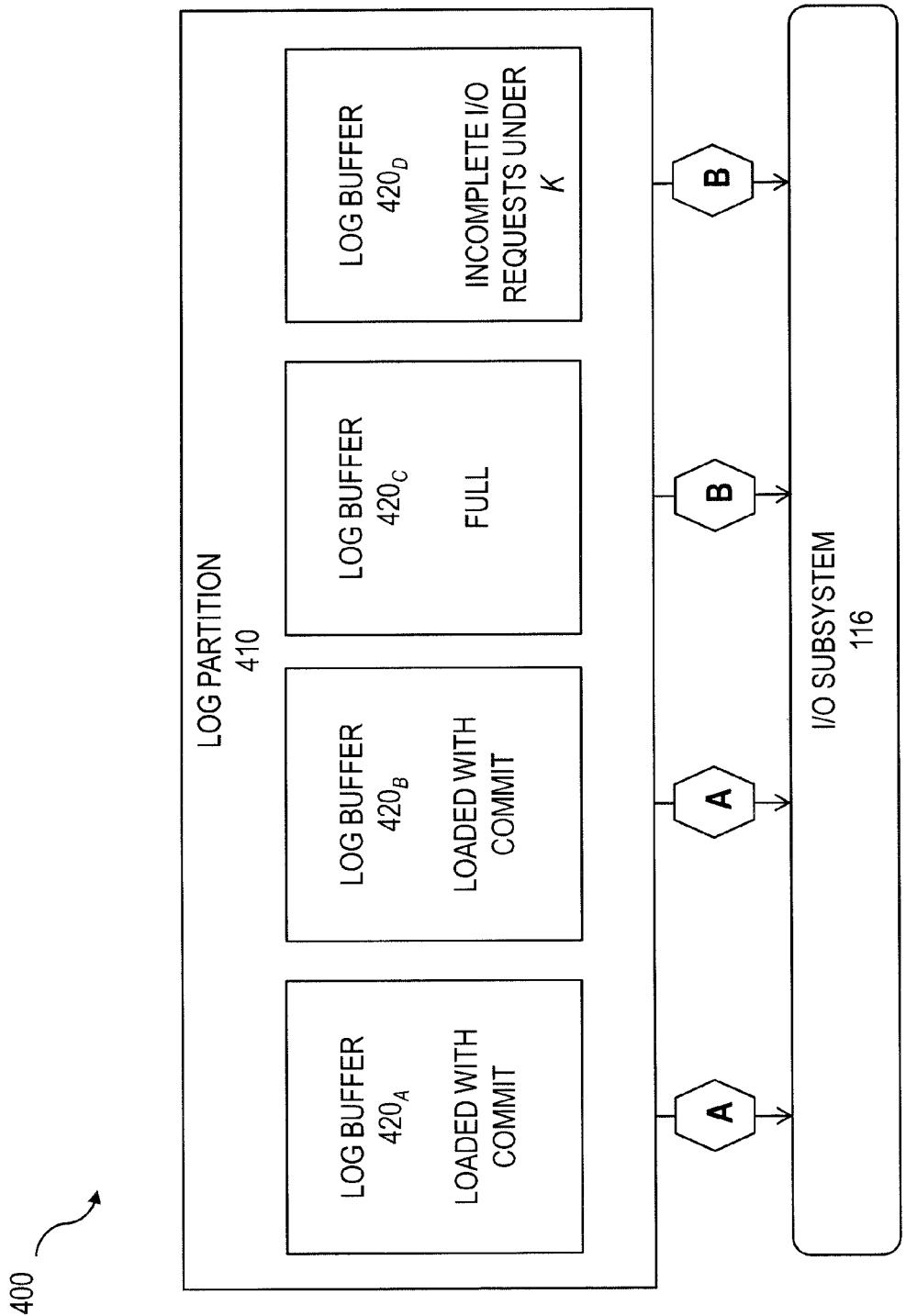
FIG. 4 is a diagram illustrating transactions loaded in log buffers and sent to an I/O subsystem.

To implement implicit commit grouping, the logger 344 simply keeps each partition I/O queue loaded with k outstanding I/Os. With reference to the diagram 400 of FIG. 4, assuming several log buffers $420_A \ldots _D$ (which are part of a log partition 410), if k+1 or more transactions complete in fast succession, first k commits would immediately close their respective log buffers $420_A \ldots 420_B$, current at the respective time of their commit (assuming k=2) and send (reference A) these buffers to the I/O subsystem 116. When k+1st and latter transactions complete, they will find the I/O subsystem 116 already loaded with k requests, so the log buffer $420_C/420_D$ will not be closed and sent to I/O immediately, but instead kept open for further log entries.

Thus, all commits can accumulate in this log buffer $410_C/410_D$, either until it is full, as seen in the example for $410_C$, or until the number of outstanding incomplete I/O requests handled by the I/O subsystem 116 falls under k, as seen in the example for $410_D$. At this time, the respective current buffer $410_C/410_D$ are closed and put (reference B) to I/O immediately. This effectively provides implicit group commit capability at no additional cost, especially no additional data structures and no additional synchronization. As a side effect, this arrangement offloads the I/O subsystem 116 from maintaining a lot of I/O control blocks for parallel I/O and reduces disk space overhead of the log for OLTP load.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A non-transitory computer program product storing instructions that, when executed by at least one programmable processor, cause the at least one programmable processor to perform operations comprising:
   receiving, in a data storage application including a plurality of log buffers, an indication of the number of input/output (I/O) requests that an I/O subsystem is capable of concurrently processing;
   determining, based on the indication of the number of I/O requests that the I/O subsystem is capable of concurrently processing, a number k of active parallel I/Os for a plurality of log partitions;
   loading, in the data storage application including a plurality of log buffers, first k log buffers with exactly one database transaction into memory, each log buffer being written to one of the plurality of log partitions, each log partition being stored in a separate physical storage device;
   sending each of the log buffers to the I/O subsystem upon each log buffer being respectively loaded with a single transaction;
   accumulating, after sending the k log buffers to the I/O subsystem, transactions in respective new log buffers; and
   sending all of the log buffers with the accumulated transactions to the I/O subsystem when the earlier occurs of (i) the respective new log buffer being full or (ii) a number of incomplete input/output requests handled by the I/O subsystem falls below k.

2. A computer program product as in claim 1, wherein there are k active I/O operations active on each log partition, wherein for n log partitions, log buffers belonging to the first k*n transactions are immediately closed and sent to the I/O subsystem.

3. A computer program product as in claim 1, wherein the respective log buffers are closed prior to their being sent to the I/O subsystem.

4. A computer program product as in claim 1, wherein the log buffers are distributed to log partitions according to a round-robin distribution.

5. A computer program product as in claim 1, wherein the operations further comprise: generating a log by assembling a list of log entries based on the log buffers sent to the I/O subsystem.

6. A computer program product as in claim 5, wherein the operations further comprise: initiating data recovery using the log upon an occurrence of a data recovery event.

7. A computer program product as in claim 5, wherein the transactions are committed.

8. A computer program products as in claim 7, wherein confirmation of a committed transaction is sent to a corresponding application only after all data of the transaction and all previously-committed transactions has been persisted to the log.

9. A computer program product as in claim 1, wherein the data storage application comprises an in-memory database.

10. A computer program product as in claim 1, wherein each log partition corresponds to segregated or separate physical disk storage space.

11. A method comprising:
   receiving, in a data storage application including a plurality of log buffers, an indication of the number of input/output (I/O) requests that an I/O subsystem is capable of concurrently processing;
   determining, based on the indication of the number of I/O requests that the I/O subsystem is capable of concurrently processing, a number k of active parallel I/Os for a plurality of log partitions;
   loading, in the data storage application including a plurality of log buffers, first k log buffers with exactly one database transaction into memory, each log buffer being written to one of the plurality of log partitions, each log partition being stored in a separate physical storage device;
   sending each of the log buffers to the I/O subsystem upon each log buffer being respectively loaded with a single transaction;
   accumulating, after sending the k log buffers to the I/O subsystem, transactions in respective new log buffers; and
   sending all of the log buffers with the accumulated transactions to the I/O subsystem when the earlier occurs of (i) the respective new log buffer being full or (ii) a number of incomplete input/output requests handled by the I/O subsystem falls below k.

12. A method as in claim 11, wherein there are k active I/O operations active on each log partition, wherein for n log partitions, log buffers belonging to the first k*n transactions are immediately closed and sent to the I/O subsystem.

13. A method as in claim 11, wherein the respective log buffers are closed prior to their being sent to the I/O subsystem.

14. A method as in claim 11, wherein the log buffers are distributed to log partitions according to a round-robin distribution.

15. A method as in claim 11, further comprising: generating a log by assembling a list of log entries based on the log buffers sent to the I/O subsystem.

16. A method as in claim 15, further comprising: initiating data recovery using the log upon an occurrence of a data recovery event.

17. A method as in claim 15, wherein the transactions are committed.

18. A method as in claim 17, wherein confirmation of a committed transaction is sent to a corresponding application only after all data of the transaction and all previously-committed transactions has been persisted to the log.

19. A method as in claim 11, wherein each log partition corresponds to segregated or separate physical disk storage space.

20. A system comprising:
   a plurality of physical storage devices;
   at least one programmable processor;
   memory coupled to the at least one programmable processor, the memory storing instructions, which when executed by the at least one programmable processor, cause the at least one programmable processor to perform operations comprising:
      receiving, in a data storage application including a plurality of log buffers, an indication of the number of input/output (I/O) requests that an I/O subsystem is capable of concurrently processing;
      determining, based on the indication of the number of I/O requests that the I/O subsystem is capable of concurrently processing, a number k of active parallel I/Os for a plurality of log partitions;
      loading, in the data storage application including a plurality of log buffers, first k log buffers with exactly one database transaction into memory, each log buffer being written to one of the plurality of log partitions, each log partition being stored in a separate physical storage device;

sending each of the log buffers to the I/O subsystem upon each log buffer being respectively loaded with a single transaction;

accumulating, after sending the k log buffers to the I/O subsystem, transactions in respective new log buffers; and sending all of the log buffers with the accumulated transactions to the I/O subsystem when the earlier occurs of (i) the respective new log buffer being full or (ii) a number of incomplete input/output requests handled by the I/O subsystem falls below k.

\* \* \* \* \*